US007933405B2

(12) United States Patent
Knowles et al.

(10) Patent No.: US 7,933,405 B2
(45) Date of Patent: Apr. 26, 2011

(54) DATA ACCESS AND PERMUTE UNIT

(75) Inventors: Simon Knowles, Bath (GB); Stephen Felix, Bristol (GB)

(73) Assignee: Icera Inc., Wilmington, DE (US)

( * ) Notice: Subject to any disclaimer, the term of this patent is extended or adjusted under 35 U.S.C. 154(b) by 1663 days.

(21) Appl. No.: 11/102,266

(22) Filed: Apr. 8, 2005

(65) Prior Publication Data

US 2006/0227966 A1 Oct. 12, 2006

(51) Int. Cl.
*H04L 9/00* (2006.01)
(52) U.S. Cl. ............................. 380/42; 380/37; 380/47
(58) Field of Classification Search .................... 380/42, 380/37, 47
See application file for complete search history.

(56) References Cited

U.S. PATENT DOCUMENTS

| | | | | | |
|---|---|---|---|---|---|
| 5,175,862 A | * | 12/1992 | Phelps et al. | ...................... | 712/7 |
| 5,471,628 A | * | 11/1995 | Phillips et al. | ................ | 712/223 |
| 5,513,366 A | * | 4/1996 | Agarwal et al. | ................. | 712/22 |
| 5,561,784 A | * | 10/1996 | Chen et al. | ..................... | 711/157 |
| 5,815,572 A | * | 9/1998 | Hobbs | ........................... | 380/215 |
| 5,838,984 A | * | 11/1998 | Nguyen et al. | ..................... | 712/5 |
| 5,850,452 A | * | 12/1998 | Sourgen et al. | ................ | 713/190 |
| 5,872,987 A | * | 2/1999 | Wade et al. | ........................ | 712/3 |
| 5,881,307 A | * | 3/1999 | Park et al. | ........................ | 712/23 |
| 5,887,183 A | * | 3/1999 | Agarwal et al. | ................... | 712/2 |
| 5,922,066 A | * | 7/1999 | Cho et al. | ....................... | 712/204 |
| 5,991,865 A | * | 11/1999 | Longhenry et al. | ................ | 712/7 |
| 5,996,057 A | * | 11/1999 | Scales et al. | ....................... | 712/5 |
| 6,058,465 A | * | 5/2000 | Nguyen | ............................. | 712/7 |
| 6,078,941 A | * | 6/2000 | Jiang et al. | .................... | 708/625 |
| 6,098,162 A | * | 8/2000 | Schiffleger et al. | ............... | 712/4 |
| 6,178,500 B1 | * | 1/2001 | Roth | .............................. | 712/300 |
| 6,182,216 B1 | * | 1/2001 | Luyster | ......................... | 713/168 |
| 6,219,775 B1 | * | 4/2001 | Wade et al. | ...................... | 712/11 |
| 6,223,320 B1 | * | 4/2001 | Dubey et al. | ................... | 714/757 |
| 6,311,280 B1 | * | 10/2001 | Vishin | ........................... | 713/320 |
| 6,324,226 B1 | * | 11/2001 | Sasagawa | ..................... | 375/341 |
| 6,327,651 B1 | * | 12/2001 | Dubey et al. | ................... | 712/300 |
| 6,334,176 B1 | * | 12/2001 | Scales et al. | ....................... | 712/4 |
| 6,343,337 B1 | * | 1/2002 | Dubey et al. | ................... | 710/317 |
| 6,411,652 B1 | * | 6/2002 | Sivan | ........................ | 375/240.16 |
| 6,446,190 B1 | * | 9/2002 | Barry et al. | ....................... | 712/24 |
| 6,560,362 B1 | * | 5/2003 | Piret et al. | ..................... | 382/232 |
| 6,578,061 B1 | * | 6/2003 | Aoki et al. | ..................... | 708/520 |
| 6,704,834 B1 | * | 3/2004 | Demeure et al. | .................. | 711/5 |
| 6,718,456 B1 | * | 4/2004 | Ott | ................................ | 712/210 |
| 6,839,828 B2 | * | 1/2005 | Gschwind et al. | .............. | 712/20 |
| 6,842,850 B2 | * | 1/2005 | Ganapathy et al. | ........... | 712/221 |
| 6,859,818 B2 | * | 2/2005 | Aoki et al. | ..................... | 708/520 |
| 6,922,716 B2 | * | 7/2005 | Desai et al. | .................... | 708/524 |

(Continued)

OTHER PUBLICATIONS

Diefendorff et al., Altivec Extension to PowerPC Accelerates Media Processing, 2000, IEEE.*

(Continued)

*Primary Examiner* — David García Cervetti

(57) ABSTRACT

According to embodiments of the invention, there is disclosed a data processing unit, a method of operating the same, computer program product and an instruction. In one embodiment according to the invention, there is provided a data processing unit for a computer processor, the data processing unit comprising a deep register access mechanism capable of performing a permutation operation on at least one data operand accessed from a register file of the computer processor, the permutation operation being performed in series with (i) register access for the data operand and (ii) execution of a data processing operation on the operand.

42 Claims, 15 Drawing Sheets

U.S. PATENT DOCUMENTS

| | | | | |
|---|---|---|---|---|
| 6,931,511 | B1* | 8/2005 | Weybrew et al. | 712/4 |
| 6,944,744 | B2* | 9/2005 | Ahmed et al. | 712/20 |
| 7,014,122 | B2* | 3/2006 | Datta et al. | 235/494 |
| 7,043,627 | B2* | 5/2006 | Shimizu et al. | 712/225 |
| 7,055,018 | B1* | 5/2006 | Bratt et al. | 712/4 |
| 7,062,637 | B2* | 6/2006 | Ganapathy et al. | 712/221 |
| 7,124,318 | B2* | 10/2006 | Luick | 714/10 |
| 7,126,991 | B1* | 10/2006 | Mimar | 375/240.16 |
| 7,142,670 | B2* | 11/2006 | Chari et al. | 380/28 |
| 7,219,212 | B1* | 5/2007 | Sanghavi et al. | 712/6 |
| 7,237,097 | B2* | 6/2007 | Kissell et al. | 712/223 |
| 7,240,236 | B2* | 7/2007 | Cutts et al. | 714/6 |
| 7,284,092 | B2* | 10/2007 | Nunamaker et al. | 711/122 |
| 7,302,627 | B1* | 11/2007 | Mimar | 714/741 |
| 7,386,844 | B2* | 6/2008 | Heishi et al. | 717/161 |
| 7,398,347 | B1* | 7/2008 | Pechanek et al. | 711/100 |
| 7,725,678 | B2* | 5/2010 | Krueger | 712/4 |
| 7,809,931 | B2* | 10/2010 | Raubuch | 712/221 |
| 2001/0034754 | A1* | 10/2001 | Elwahab et al. | 709/201 |
| 2002/0026570 | A1* | 2/2002 | Shimizu et al. | 712/225 |
| 2002/0116602 | A1* | 8/2002 | Kissell et al. | 712/223 |
| 2003/0014457 | A1* | 1/2003 | Desai et al. | 708/520 |
| 2003/0023833 | A1* | 1/2003 | Ganapathy et al. | 712/35 |
| 2003/0037221 | A1* | 2/2003 | Gschwind et al. | 712/3 |
| 2003/0044003 | A1* | 3/2003 | Chari et al. | 380/28 |
| 2003/0154360 | A1* | 8/2003 | Ganapathy et al. | 712/210 |
| 2004/0128485 | A1* | 7/2004 | Nelson | 712/218 |
| 2004/0154006 | A1* | 8/2004 | Heishi et al. | 717/140 |
| 2004/0181652 | A1* | 9/2004 | Ahmed et al. | 712/215 |
| 2004/0196971 | A1* | 10/2004 | Disch et al. | 380/36 |
| 2004/0223610 | A1* | 11/2004 | Henry et al. | 380/37 |
| 2004/0228479 | A1* | 11/2004 | Crispin et al. | 380/28 |
| 2004/0228481 | A1* | 11/2004 | Crispin et al. | 380/28 |
| 2004/0228483 | A1* | 11/2004 | Henry et al. | 380/37 |
| 2004/0250090 | A1* | 12/2004 | Crispin et al. | 713/189 |
| 2004/0250091 | A1* | 12/2004 | Henry et al. | 713/189 |
| 2004/0252842 | A1* | 12/2004 | Henry et al. | 380/277 |
| 2004/0255129 | A1* | 12/2004 | Henry et al. | 713/189 |
| 2004/0255130 | A1* | 12/2004 | Henry et al. | 713/189 |
| 2005/0055539 | A1* | 3/2005 | Pechanek et al. | 712/207 |
| 2005/0066148 | A1* | 3/2005 | Luick | 712/1 |
| 2005/0097301 | A1* | 5/2005 | Ben-David et al. | 712/22 |
| 2005/0139647 | A1* | 6/2005 | Datta et al. | 235/61 R |
| 2005/0160279 | A1* | 7/2005 | Henry et al. | 713/189 |
| 2005/0188216 | A1* | 8/2005 | Crispin et al. | 713/190 |
| 2005/0226337 | A1* | 10/2005 | Dorojevets et al. | 375/240.24 |
| 2005/0289299 | A1* | 12/2005 | Nunamaker et al. | 711/122 |
| 2006/0015705 | A1* | 1/2006 | Raubuch | 712/222 |
| 2006/0095729 | A1* | 5/2006 | Hokenek et al. | 712/214 |
| 2006/0184765 | A1* | 8/2006 | Krueger | 712/4 |
| 2006/0190700 | A1* | 8/2006 | Altman et al. | 712/7 |
| 2006/0225061 | A1* | 10/2006 | Ludwig et al. | 717/161 |
| 2007/0011434 | A1* | 1/2007 | Luick | 712/11 |
| 2008/0022044 | A1* | 1/2008 | Nunamaker et al. | 711/122 |
| 2008/0077769 | A1* | 3/2008 | Mimar | 712/22 |

OTHER PUBLICATIONS

Ruby B. Lee. Efficiency of microSIMD architectures and index-mapped data for media processors. Invited paper. Proceedings of Media Processors 1999, pp. 34-46. Jan. 25-29, 1999.*

Grunwald et al., Kool Chips Workshop, Dec. 2000, MICRO33.*

* cited by examiner

| 3 | 2 | 1 | 0 |
|---|---|---|---|
| 7 | 6 | 5 | 4 |
| 11 | 10 | 9 | 8 |
| 15 | 14 | 13 | 12 |
| 19 | 18 | 17 | 16 |
| 23 | 22 | 21 | 20 |
| 27 | 26 | 25 | 24 |
| 31 | 30 | 29 | 28 |

| 17 | 1 | 16 | 0 |
|---|---|---|---|
| 19 | 3 | 18 | 2 |
| 21 | 5 | 20 | 4 |
| 23 | 7 | 22 | 6 |
| 25 | 9 | 24 | 8 |
| 27 | 11 | 26 | 10 |
| 29 | 13 | 28 | 12 |
| 31 | 15 | 30 | 14 |

| 3 | 2 | 1 | 0 |
|---|---|---|---|
| 7 | 6 | 5 | 4 |
| 11 | 10 | 9 | 8 |
| 15 | 14 | 13 | 12 |
| 19 | 18 | 17 | 16 |
| 23 | 22 | 21 | 20 |
| 27 | 26 | 25 | 24 |
| 31 | 30 | 29 | 28 |
| 35 | 34 | 33 | 32 |
| 39 | 38 | 37 | 36 |
| 43 | 42 | 41 | 40 |
| 47 | 46 | 45 | 44 |
| 51 | 50 | 49 | 48 |
| 55 | 54 | 53 | 52 |
| 59 | 58 | 57 | 56 |
| 63 | 62 | 61 | 60 |

| 33 | 1 | 32 | 0 |
|---|---|---|---|
| 35 | 3 | 34 | 2 |
| 37 | 5 | 36 | 4 |
| 39 | 7 | 38 | 6 |
| 41 | 9 | 40 | 8 |
| 43 | 11 | 42 | 10 |
| 45 | 13 | 44 | 12 |
| 47 | 15 | 46 | 14 |
| 49 | 17 | 48 | 16 |
| 51 | 19 | 50 | 18 |
| 53 | 21 | 52 | 20 |
| 55 | 23 | 54 | 22 |
| 57 | 25 | 56 | 24 |
| 59 | 27 | 58 | 26 |
| 61 | 29 | 60 | 28 |
| 63 | 31 | 62 | 30 |

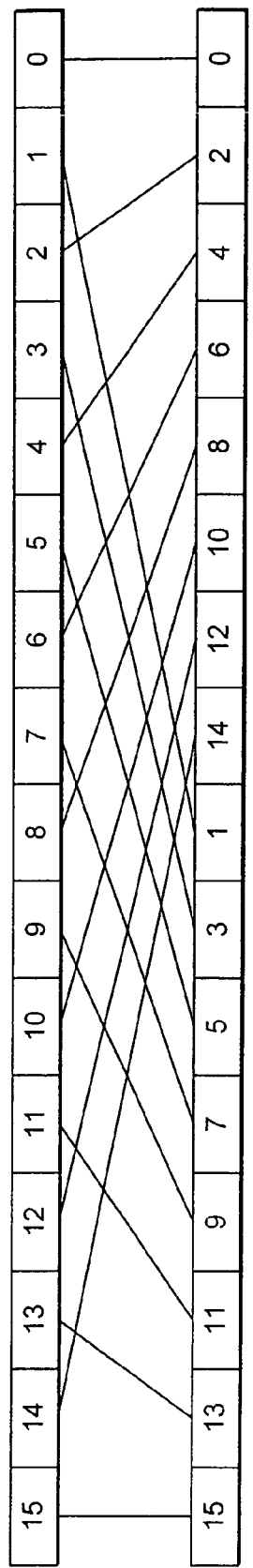

| DRA type | Xbar0_ct13 | Xbar0_ct12 | Xbar0_ct11 | Xbar0_ct10 |
|---|---|---|---|---|
| NORMAL | 3 | 2 | 1 | 0 |
| ROLL 3H | 2 | 1 | 0 | 3 |
| ROLL 2H | 1 | 0 | 3 | 2 |
| ROLL 1H | 0 | 3 | 2 | 1 |
| SORT 4MH | 2 | 0 | 3 | 1 |
| SORT 4LH | 3 | 1 | 2 | 0 |

DATA ACCESS AND PERMUTE UNIT

TECHNICAL FIELD

This invention relates to a data processing unit for a computer processor, a method of operating the same, a computer program product that makes use of an instruction set for the computer processor, and an instruction.

BACKGROUND

Digital signal processing application code typically performs arithmetic processes on vectors, usually by combining data vectors with coefficient vectors. A common example is the process of convolution, but other vector processes share similar characteristics. The data and coefficient vectors are of varying size, and often quite long, so that it is not generally practical for a machine to implement the vector functionality literally. It has instead been found practical for a machine to operate directly on smaller pieces of the vectors.

In one known method, the Single Instruction Multiple Data (SIMD) technique applies a single operation contained in an instruction to each element of one or more short vectors of data. The registers of a SIMD machine are designed to hold such short data vectors; for example, a 64-bit register may contain four 16-bit data elements forming a short vector or part of a larger vector. SIMD techniques are an effective way of increasing digital signal processor performance, by increasing the operations per cycle of the processor.

Digital signal processing programs therefore typically use a short vector SIMD machine to perform a long vector operation. In order to do so, it is often necessary for the program structure to interleave arithmetic operations with vector permutation operations. The vector permutations may be necessary, for example, in order to gather elements from the longer vectors of the algorithm to be supplied as operands to the short vector datapaths of the machine; or in order to distribute the result elements from a short vector operation to different locations in the long vector result.

SUMMARY

According to an aspect of the present invention, there is provided a data processing unit for a computer processor, the data processing unit comprising a register access mechanism capable of performing a permutation operation responsive to a data access instruction on at least one data operand accessed from a register file of the computer processor, the permutation operation being performed in series with both a register access for the data operand and execution of a data processing operation on the data operand.

Preferably, the data processing unit is capable of performing a permutation operation on a single vector register operand. Preferably, it is also capable of performing a combining permutation operation on a plurality of vector register operands. Still more preferably, the combining permutation operation on said plurality of vector register operands can occur contemporaneously with the permutation operation on the single vector register operand. In a preferred embodiment, a data processing unit is thus capable of performing a different permutation operation on first and second operands or operand groups. The register access mechanism is preferably capable of performing the permutation operation in series with the register access based on a single program instruction issued to the computer processor. In a preferred embodiment, the data processing unit is capable of performing multiple consecutive operations on data operands of a single data processing instruction.

In the disclosed embodiment, the permutation operation precedes execution of the data processing operation. However a skilled person will appreciate that a data processing unit according to the invention may instead perform a permutation operation following execution of the data processing operation. In certain embodiments, hardware provides for a first permutation operation to precede execution of the data processing operation, and a second permutation operation to follow execution of the data processing operation.

Preferably, the type of the permutation operation is selected from a plurality of permutation operation types based on an opcode portion of a data processing instruction. The executed data processing operation may be selected from one or more of an arithmetic operation, a logic operation, a subsequent permutation operation, and a processor memory read or write operation.

In a disclosed embodiment, the register access mechanism comprises a register file read stage and a crossbar multiplexer stage (also referred to here in as a crossbar switching stage"). In that case, the register access mechanism comprises a set of crossbar control inputs for determining the type of the permutation operation, selected from a plurality of permutation operation types. The plurality of permutation operation types may comprise a roll permutation, a sort permutation, a shuffle permutation, a broadcast permutation, a select permutation, and another type of permutation. The type of the permutation operation may be selected from a plurality of permutation operation types based on an opcode portion of the instruction. That is, a permute opcode in the instruction is decoded by a decoder which supplies a set of control inputs to relevant inputs of the register access mechanism.

In certain embodiments, the execution pathway comprises SIMD (single instruction multiple data) circuitry.

The register access mechanism is typically capable of performing a first type of permutation operation on a first source operand pair, and a second type of permutation operation on at least one second source operand. In preferred embodiments, the execution unit is capable of single instruction multiple data execution. For example, a first type of permutation operation may comprise a permutation from the group consisting of a roll permutation, a sort permutation and a shuffle permutation; and the second type of permutation operation may comprise a broadcast permutation, with the results of both the first and second permutation operations being supplied to an SIMD execution pathway.

Preferred embodiments find particular application where the data processing unit is required to perform at least a portion of an algorithm from the group consisting of a Fast Fourier Transform, Viterbi coding, Turbo-coding, a finite impulse response filter algorithm, or another communications algorithm.

Although not intended to be limiting, the first and second type of permutation operations of the disclosed embodiment comprise operations having one or two 64-bit data-register source arguments. For example, the first type of permutation operation allows roll operations for forming a single 64-bit result from two 64-bit source values, the 64-bit result corresponding to the source values rolled left by an integer number of 16-bit half fields. In another example, the first type of permutation operation allows sort operations for forming a single 64-bit result from two 64-bit values, the 64-bit result being selectable as the most significant or the least significant 64-bits of the sorted result. The second type of permutation operation may allow a broadcast operation capable of repeating a selected 16-bit half-word across four 16-bit lanes in a 64-bit result.

According to another aspect of the present invention, there is provided a method of operating a data processing unit for a computer processor, the method comprising performing a permutation operation responsive to a data access instruction on at least one of a plurality of data operands accessed from a register file of the computer processor, the permutation operation being performed in series with (i) accessing a register to obtain the data operand and (ii) executing a data processing operation on the data operand.

Another aspect of the present invention provides a computer program product comprising program code means which include a sequence of instructions, wherein the computer program product is adapted to run on a computer such that a single data access instruction is executable to cause a permutation operation of a type determined by at least a portion of the data access instruction on at least one data operand accessed, the permutation operation being performed in series with (i) accessing a register to obtain the data operand and (ii) executing a data processing operation on the data operand.

According to another aspect of the present invention, there is provided a method comprising performing serialized register access, vector permutation and execution of a data processing operation responsive to a single instruction.

According to another aspect of the present invention, there is provided computer processor comprising, in series connectivity, a register access unit, a vector permutation capability, and at least one execution pathway, the apparatus further comprising a decode unit operable, responsive to a single instruction, to control access to at least one vector operand, to selectively permute the at least one vector operand, and to execute at least one further operation.

According to another aspect of the present invention there is provided, an instruction comprising: a data access opcode portion defining a type of data access; a permute opcode portion defining a type of permutation operation; an execution opcode portion defining a further operation; and at least one data operand source designation.

According to another aspect of the present invention, there is provided a data processing unit for a computer comprising: a register file; a register access and permute mechanism capable of accessing at least one data operand in said register file based on a data access instruction, said register access and permute mechanism comprising permute circuitry operable to selectively permute said accessed data operand based on a permute opcode portion of said instruction; and a data execution pathway arranged in series with said register access and permute mechanism, said data execution pathway being operable to perform an operation on said selectively permuted data operand based on an execution opcode portion of said instruction.

In a preferred embodiment, said register access and permute mechanism comprises a decoder register file read (and write) stage connected between said register file and said execution pathway. Preferably, said register access and permute mechanism comprises at least one multiplexer stage connected between said decoder register file read stage and said execution pathway. Typically, said register access and permute mechanism further comprises a column multiplexer stage connected between said decoder register file read stage and said execution pathway. Still more preferably said register access and permute mechanism further comprises a crossbar multiplexer stage connected between said decoder register file read stage and said execution pathway. In the preferred embodiment the crossbar multiplexer stage is connected between said column multiplexer stage and said execution pathway.

According to another aspect of the invention, a permute control input is supplied to one or more of said decoder register file read stage, said multiplexer stage, said column multiplexer stage, and said crossbar multiplexer stage.

According to another aspect of the invention, bypass circuitry connected between an output of said execution lane and an input of said register file access and permute mechanism.

In a particularly preferred embodiment, the data processing unit comprises first and second register access and permute mechanisms. The first register access and permute mechanism may be arranged to access first and second operands and to perform a permutation selected from one or more of a roll, a sort, and a shuffle. The second register access and permute mechanism may be arranged to access at least one further operand and to perform a broadcast permutation.

In the above embodiment, the first and second register access and permute mechanism each comprises one or more of (i) a decoder register file read stage connected between said register file and said execution pathway; and (ii) at least one multiplexer stage connected between said decoder register file read stage and said execution pathway. Preferably, the multiplexer stage comprises one or more of (i) a column multiplexer stage connected between said decoder register file read stage and an execution pathway; and (ii) a crossbar multiplexer stage connected between said column multiplexer stage and said execution pathway.

Another aspect of the invention is to provide data access and permute circuitry capable of accessing and selectively permuting data operands responsive to a single instruction and supplying said selectively permuted operands to an SIMD execution pathway.

Additional advantages and novel features of the invention will be set forth in part in the description which follows, and in part will become apparent to those skilled in the art upon examination of the following and the accompanying drawings; or may be learned by practice of the invention.

BRIEF DESCRIPTION OF THE DRAWINGS

For a better understanding of the present invention, and to show how the same may be carried into effect, reference will now be made, by way of example only, to the accompanying drawings, in which:

FIGS. 9A through 11 illustrate exemplary so called 'sort' or 'deinterleave' operations that may be performed 'in-line' in accordance with an embodiment of the invention;

DETAILED DESCRIPTION

In an embodiment according to the invention, a SIMD processor performs certain types of vector permutation sequentially with an arithmetic operation during register accesses, using a two-stage datapath driven by a single instruction. This type of operation is referred to herein as an "in-lined" operation. The processor therefore removes or reduces the need for explicit permutation instructions to be included in the program alongside SIMD memory access, logical, and arithmetic instructions. Instead each instruction may specify both a SIMD operation and associated operand permutations (if required) to be applied before the SIMD operation. Program size is therefore decreased, and machine performance increased.

Figure 1:
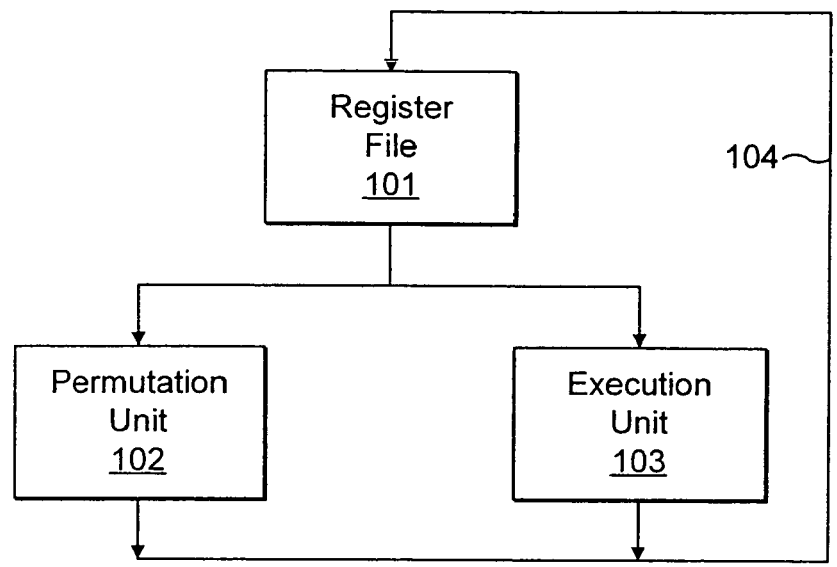
FIG. 1 shows the basic architecture of a prior art machine including a permutation unit.
Figure 2:
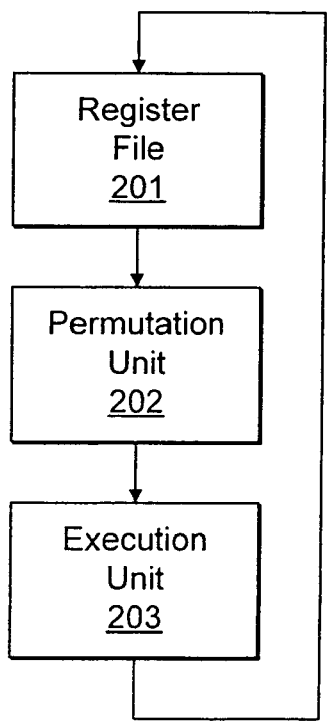
FIG. 2 shows the basic architecture of in-lined permuted register access, according to an embodiment of the invention.

By contrast with an embodiment according to the invention, in which a SIMD processor performs permutations in-line with an arithmetic operation during register accesses, prior art SIMD processors needed explicit permutation instructions to be included in the program alongside an associated arithmetic operation. The contrast between the basic architecture of a prior art SIMD processor and an embodiment according to the invention may be seen with reference to FIGS. 1 and 2. FIG. 1 shows the basic architecture of a prior art SIMD processor, in which data from a register file 101 is used by either a permutation unit 102 or an execution unit 103, which are arranged in parallel. As can be seen, data permuted by the permutation unit 102 must be fed back in path 104, to the register file, before it can be subsequent used as an operand by the execution unit 103. By contrast, FIG. 2 shows the architecture of an embodiment according to the invention, in which operands from a register file 201 a passed through a permutation unit 202, which then feeds the permuted operands directly to an execution unit 203. In embodiments of the invention it is not necessary to supply the permuted operands back to the register file before supplying them to the execution unit. The parallel architecture 102-103 of the prior art processor in FIG. 1, is thus replaced by the series architecture 202-203 of the embodiment of FIG. 2, which, as seen below, may be implemented using the hardware of FIGS. 16-18. The series architecture of an embodiment according to the invention has many performance advantages, particularly for signal-processing algorithms that use frequent permutation of data operand to match the short vector width of machine hardware to the longer vector widths of in the processor memory or register file. In a pipelined processor there may be a penalty of added latency from the serialization of permutation with SIMD execution, but signal processing programs can be organized such that this additional latency does not cancel out the performance advantages of embodiments of the present invention. The serialization of register access, vector permutation and execution (in particular SIMD execution) is sometimes referred to herein as "deep register access".

In embodiments according to the invention, an in-line vector permutation may be applied to one or more operands of the instruction, which may be a data processing instruction. In a SIMD machine that uses instructions having two source operands and one result operand, it is particularly useful to apply certain types of permutation to one source operand, while applying different types of permutation to the other source operand.

Three classes of sequential permutation are found particularly useful for digital signal processing, in accordance with an embodiment of the invention: broadcasts; rolls; and sorts. A fourth class of permutation, called shuffles, can frequently be used as an alternative to sorts (with some rearrangement of the issuing algorithm or its data), but turns out to be less advantageous than sorts in that it requires more versatile register file access capabilities. Nevertheless the class of shuffles may sometimes find application in embodiments of the invention.

In a first class of sequential permutation, an embodiment according to the invention provides an in-lined broadcast permutation. This embodiment is particularly useful for performing convolution processes such as finite impulse response (FIR) filters, which typically combine a single coefficient element with each element of a long data vector. To use the short vector (e.g. SIMD) registers of the machine efficiently, several such coefficient elements are packed into each register. The purpose of the broadcast permutation is therefore to extract a single element from a short vector register operand and to replicate it to all elements of the short vector passed to the SIMD execution unit.

In a second class of sequential permutation, an embodiment according to the invention provides an in-lined roll permutation. This embodiment is particularly useful for "sliding-window" algorithms, such as certain FIR filters. In such filters, two long vectors are combined element-pairwise; then one vector is shifted by one element position, and the element-pairwise operation repeated; then the vector is shifted again, and the element-pairwise operation is repeated; and so on. In a conventional machine, when the number of coefficients is large and the data vectors to be filtered are large, both the coefficients and the data vectors must be resident in the processor's external memory, rather than in registers. For a SIMD machine such a "sliding-window" algorithm usually implies the processor being able to load from memory a short vector at arbitrary vector element alignment (an "unaligned" access), e.g. a 64-bit word at 16-bit alignment. In a conventional machine, this means that each element must be loaded from external memory multiple times (for example, four times for a 64-bit word with 16-bit alignment), as the sliding window moves over the width of the short vector. Because of the large number of external memory loads, conventional techniques are therefore expensive in power and memory bandwidth. Furthermore, it is usually more difficult and expensive to design a memory systems capable of unaligned accesses.

By contrast, the roll permutation of an embodiment according to the invention allows repeated and systematic unaligned accesses of external memory to be replaced by far fewer aligned memory accesses. In a roll permutation embodiment, a short vector operand is extracted from the concatenation of two adjacent short vectors in the register file. So this type of permutation operation requires two adjacent register values to be read, and a permutation is then applied to extract a single short vector which is passed to the execution unit. For example, two 64-bit register values, each containing 4-element vectors with 16 bits per element, may be rolled together to form a single 4-element vector of 64 bits using one of the transformations shown in FIGS. 3A-C. Instead of repeatedly accessing external memory, the processor now accesses the register file, which usually has more bandwidth available and lower power cost per access. Furthermore, the processors memory system can be simplified because it does not need to support unaligned access.

In a third class of sequential permutation, an embodiment according to the invention provides in-lined sort and/or shuffle permutations. In a shuffle permutation, elements of two vectors are interleaved; while in a sort permutation, even and odd elements are separated (de-interleaved). These types of permutation find application in Fast Fourier Transform, Viterbi, and Turbo-code algorithms, and other common algorithms. In general, a programmer can choose to cast an algorithm to use predominantly, or entirely, sorts in preference to shuffles, or vice versa.

In an in-lined sort permutation according to an embodiment of the invention, two short vector pieces of a long vector are read from two adjacent registers and a sort operation is applied to combine them into one short vector operand for the subsequent SIMD arithmetic operation. Whatever the effective length of the long vector that is being sorted, the two short vector pieces to be combined can always be conveniently arranged to reside in adjacent registers. This property does not naturally apply to shuffles, as can be seen by comparing FIG. 14 with FIGS. 12A-13. So shuffles generally require reading two non-adjacent register values (the extent of separation depending on the size of the large vector) making sorts preferable to shuffles as stated earlier. Nevertheless it may simplify the job of a programmer to be able to use a free mix of shuffles and sorts, so that the additional complication of accessing non-adjacent register pairs may be justified in some embodiments of the invention.

In accordance with an embodiment of the invention, data processing instructions that use data registers as source operands use in-lined permutation operations, known as Deep Register Access operations, to perform a selected permutation operation on the value yielded when the registers are read. In preferred embodiments, special assembly language syntax is used to denote the permutation performed by Deep Register Access, and which registers it uses. There are two forms of Deep Register Access, one for each data operand sent to the execution unit; the first form is denoted $DRA_0$ access, and the second is denoted $DRA_1$ access. Each data-register source can be considered as a short vector comprised of a number of lane-width elements, for example four lanes each of $16b$ comprising a $64b$ register source. Both the register source and its constituent elements may be termed "operands" depending on context. In $DRA_0$ access, permutation operations are available for shuffling and sorting of the elements of register sources; and rolling of elements by multiples of the element (lane) width. Shuffling and sorting mean the interleaving and de-interleaving respectively of lane-width elements from one or two register sources. Rolling means the selection of a contiguous register-width group of lane-width elements from the concatenation of two register sources. In $DRA_1$ access, permutation operations are available for broadcasting of an element picked from a selected lane to all the lanes of a register operand.

Table 1 details examples of $DRA_0$ operations, which may be used for performing roll and sort permutations for a first data-register source argument, in accordance with an embodiment of the invention. In Table 1, register lanes for a first 64-bit value, value0, are symbolized 0, 1, 2, and 3, where lane 0 signifies least significant bits 0 through 15 of value0, lane 1 signifies bits 16 through 31, lane 2 signifies bits 32 through 47, and lane 3 signifies bits 48 through 63; while register lanes for a second 64-bit value, value1, are symbolized A, B, C, and D, where lane A signifies least significant bits 0 through 15 of value1, lane B signifies bits 16 through 31, lane C signifies bits 32 through 47, and lane D signifies bits 48 through 63. The set of permutations shown makes use of registers $di and $dj, where i=0..63 and j=((i+1) % 64). The columns of Table 1 show the assembly syntax, meaning, lanes, and operations for the $DRA_0$ operations.

TABLE 1

$DRA_0$ Operations

| $DRA_0$ Assembly Syntax | Meaning | Lanes | Operation |
|---|---|---|---|
| $Di:Dj:ROLL__3H | Roll by 3 lanes | C, B, A, 3 | Roll3Half (value0, value1) |
| $Di:$Dj:ROLL__2H | Roll by 2 lanes | B, A, 3, 2 | Roll2Half (value0, value1) |
| $Di:$Dj:ROLL__1H | Roll by 1 lane | A, 3, 2, 1 | Roll1Half (value0, value1) |
| $Di:$Dj:SORT__4MH | Sort most significant byte of half values | D, B, 3, 1 | Sort4MHalf (value0, value1) |
| $Di:$Dj:SORT__4LH | Sort least significant byte of half values | C, A, 2, 0 | Sort4LHalf (value0, value1) |

Figure 3A:
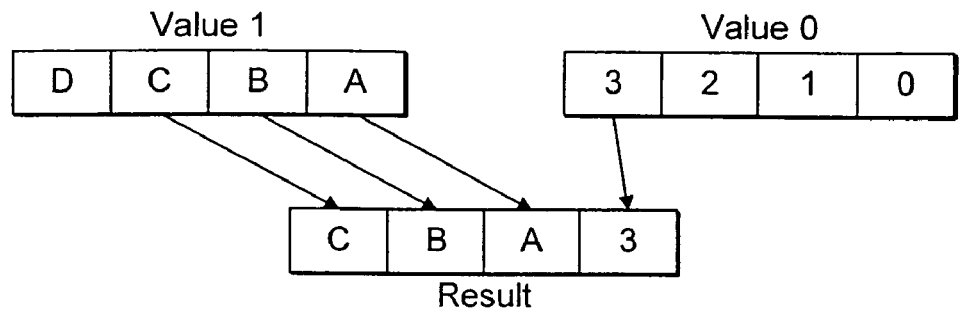
FIGS. 3A through 3C illustrate exemplary operations that may be used for performing so called 'roll' or 'sliding window' permutations that may be performed 'in-line', in accordance with an embodiment of the invention.
Figure 3B:
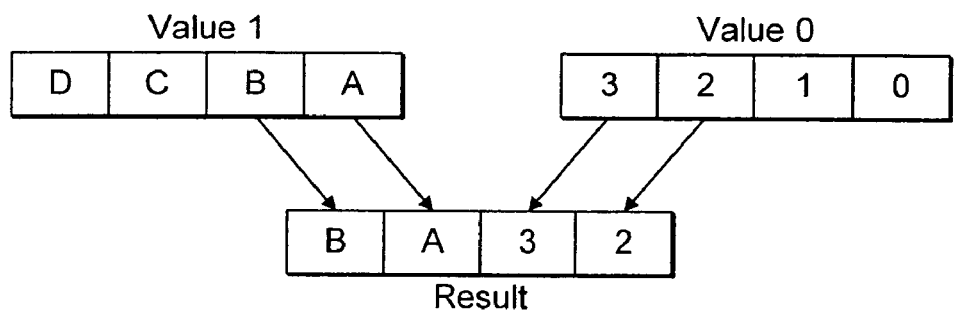
Figure 3C:
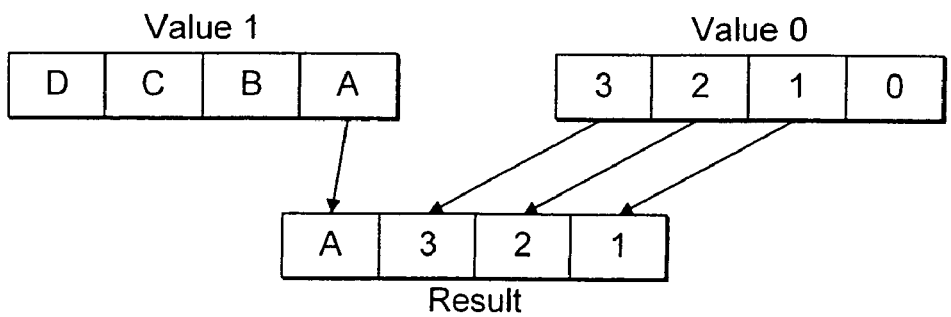

FIGS. 3A through 3C illustrate the permutation operations of Table 1, in accordance with an embodiment of the invention. As shown in FIG. 3A through 3C, the Roll3Half, Roll2Half, and Roll1Half operations in Table 1 take two 64-bit values and form a single 64-bit result corresponding to the source values rolled left by three, two, or one 16-bit fields (respectively). The term half (or half word) by convention referring to a 16 bit value. The Sort4MHalf and Sort4LHalf operations in Table 1 combine two 64-bit values into a 64-bit result, to yield either the most significant or least significant 64-bit result (respectively). The sort permutations of Table 1 may be represented graphically in the manner of FIG. 9B.

Table 2, below, details examples of $DRA_1$ operations, which may be used for performing broadcast permutations for a second data-register source argument, in accordance with an embodiment of the invention. In Table 2, register lanes for a 64-bit value, value, are symbolized 0, 1, 2, and 3, where lane 0 signifies least significant bits 0 through 15 of value, lane 1 signifies bits 16 through 31, lane 2 signifies bits 32 through 47, and lane 3 signifies bits 48 through 63. The set of permutations shown makes use of register $di, where i=0..63. The columns of Table 2 show the assembly syntax, meaning, lanes, and operations for the $DRA_1$ operations.

TABLE 2

$DRA_1$ Operations

| DRA1 Assembly Syntax | Meaning | Lanes | Operation |
|---|---|---|---|
| $Di:BCAST__3H | Broadcast of lane 3 | 3, 3, 3, 3 | BCastHalf (SelectHalf (value, 3)) |

TABLE 2-continued

DRA₁ Operations

| DRA1 Assembly Syntax | Meaning | Lanes | Operation |
|---|---|---|---|
| $Di:BCAST_2H | Broadcast of lane 2 | 2, 2, 2, 2 | BCastHalf (SelectHalf (value, 2)) |
| $Di:BCAST_1H | Broadcast of lane 1 | 1, 1, 1, 1 | BCastHalf (SelectHalf (value, 1)) |
| $Di:BCAST_0H | Broadcast of lane 0 | 0, 0, 0, 0 | BCastHalf (SelectHalf (value, 0)) |
| $Di:BCAST_1W | Broadcast of word 1 | 3, 2, 3, 2 | BCastWord (SelectWord (value, 1)) |
| $Di:BCAST_0W | Broadcast of word 0 | 1, 0, 1, 0 | BCastWord (SelectWord (value, 0)) |

Figure 4A:
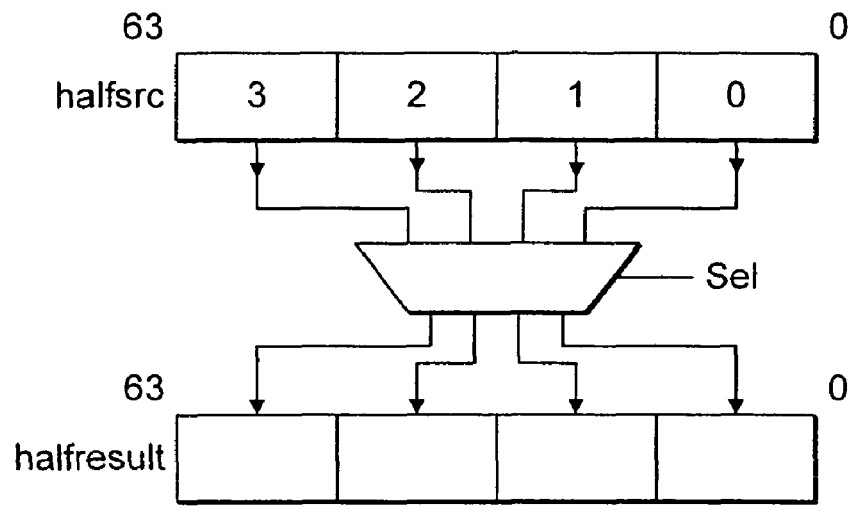
FIGS. 4A and 4B illustrate exemplary operations that may be used for performing broadcast permutations 'in-line', in accordance with an embodiment of the invention.
Figure 4B:
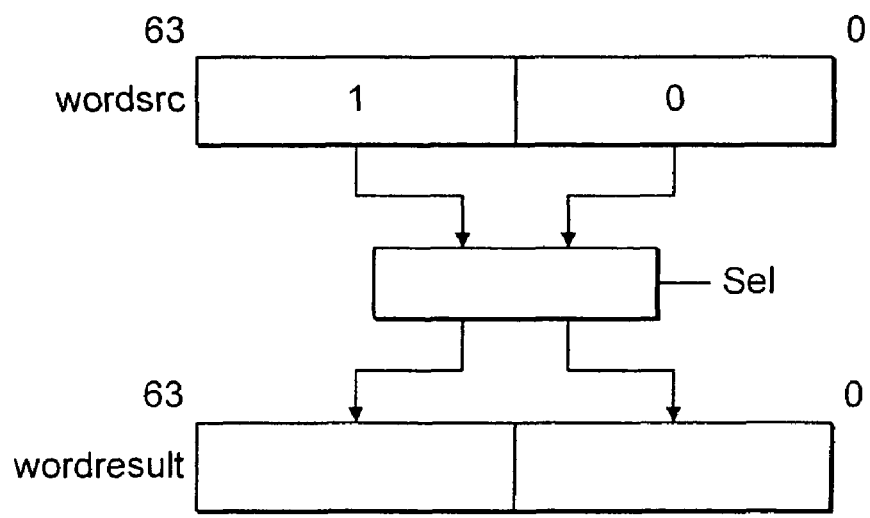

FIGS. 4A and B illustrate the permutation operations of Table 2, in accordance with an embodiment of the invention. As shown in FIG. 4A, the BCastHalf operations in Table 2 selects one of four possible 16-bit half-word source values and replicates it across the four 16-bit lanes in the result. As shown in FIG. 4B, the BCastWord operations in Table 2 select one of two possible word source values and replicate it across two 32-bit lanes in the result.

Extending the operations of Tables 1 and 2, FIGS. 5A through 11 show examples of in-lined shuffle and sort permutations that may be performed in accordance with an embodiment of the invention.

Figure 5A:
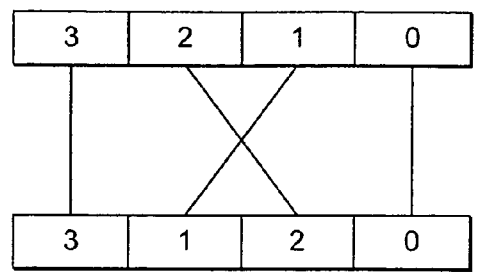
FIGS. 5A through 8 illustrate exemplary so called 'shuffle' or 'interleave' operations that may be performed 'in-line' in accordance with an embodiment of the invention.
Figure 5B:
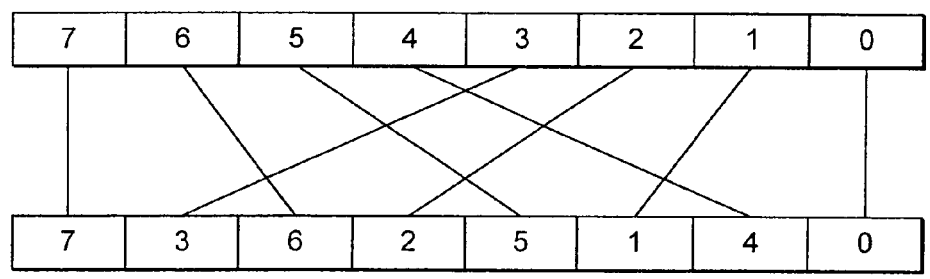
Figure 5C:
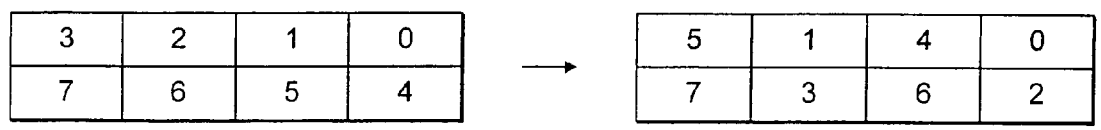
Figure 6A:
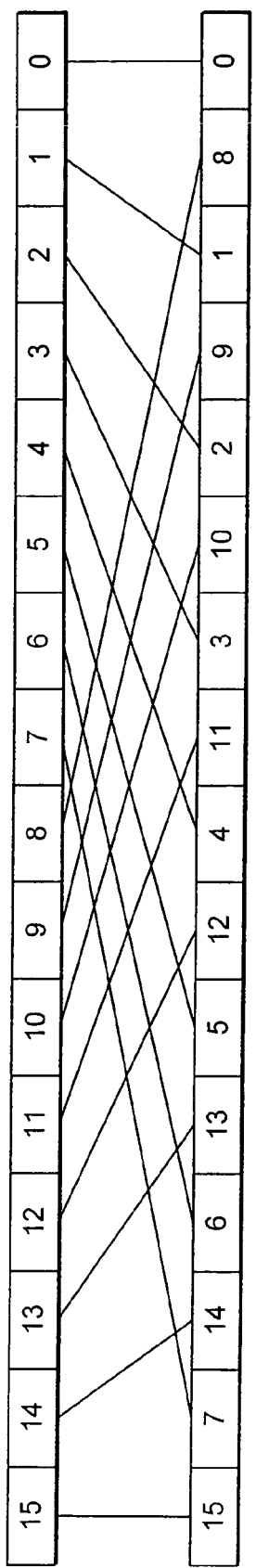
Figure 6B:
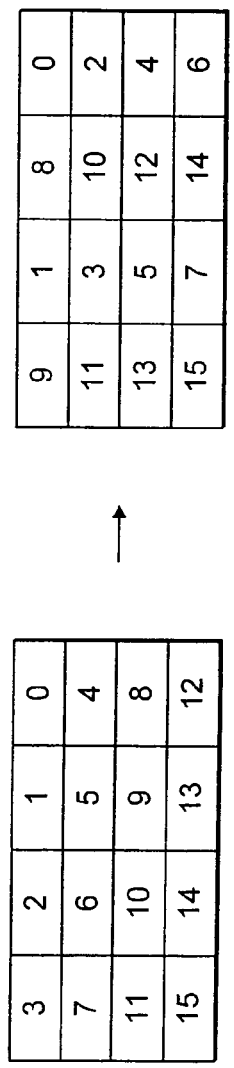
Figure 7:
Figure 8:

FIGS. 5A through 8 show shuffles of vectors with 16-bit elements stored in arrays of 64-bit registers, that may be performed "in-line" in accordance with an embodiment of the invention. FIG. 5A shows a shuffle for interleaving two vectors each consisting of two 16-bit elements; FIGS. 5B and 5C show alternative representations of a shuffle for interleaving two vectors each consisting of four 16-bit elements; FIGS. 6A and 6B show alternative representations of a shuffle for interleaving two vectors each consisting of eight 16-bit elements; FIG. 7 shows a shuffle for interleaving two vectors each consisting of sixteen 16-bit elements; and FIG. 8 shows a shuffle for interleaving two vectors each consisting of thirty-two 16-bit elements.

Figure 9A:
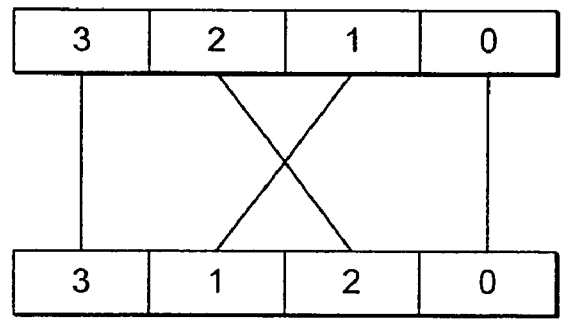
Figure 9B:
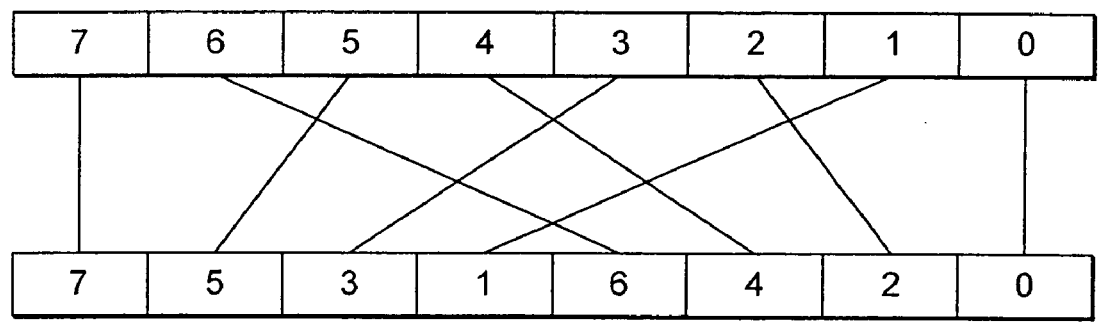
Figure 9C:
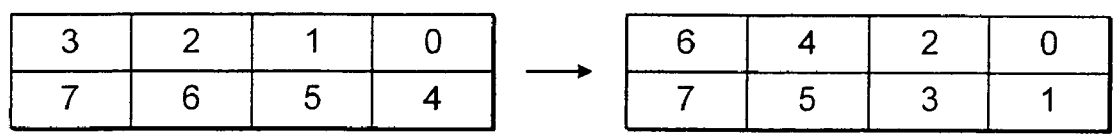
Figure 11:
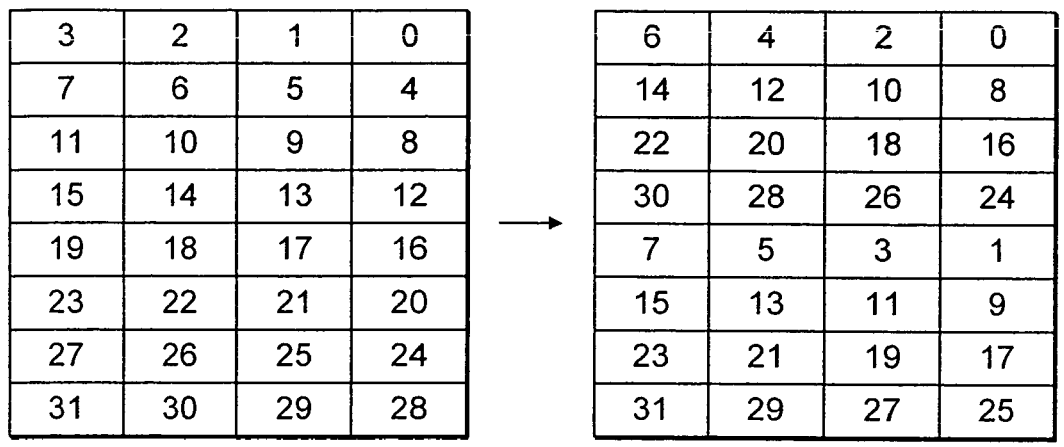

FIGS. 9A through 11 show sorts of vectors with 16-bit elements stored in arrays of 64-bit registers, that may be performed "in-line" in accordance with an embodiment of the invention. FIG. 9A shows a sort for de-interleaving two vectors each consisting of two 16-bit elements; FIGS. 9B and 9C show alternative representations of a sort for de-interleaving two vectors each consisting of four 16-bit elements; FIGS. 10A and 10B show alternative representations of a sort for de-interleaving two vectors each consisting of eight 16-bit elements; and FIG. 11 shows a sort for de-interleaving two vectors each consisting of sixteen 16-bit elements.

Figure 12A:
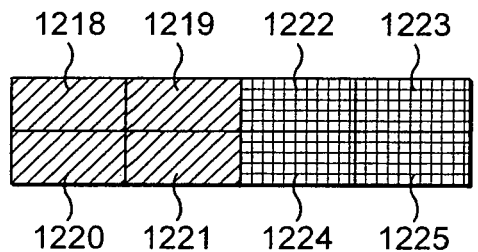
FIGS. 12A-12C and 13 show a set of sub-register access patterns to support the shuffle operations of FIGS. 5A through 8, in accordance with an embodiment of the invention.
Figure 12B:
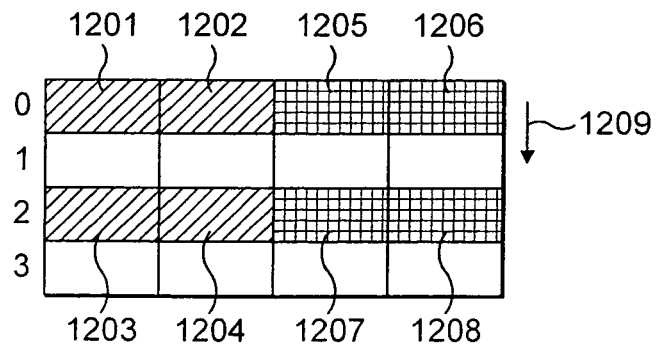
Figure 12C:
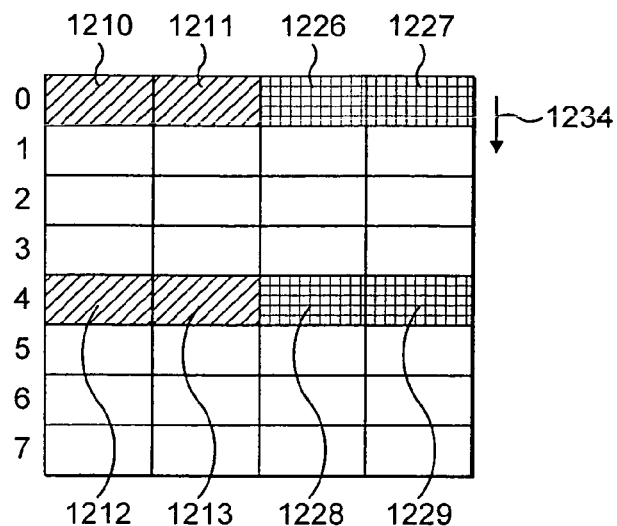
Figure 13:
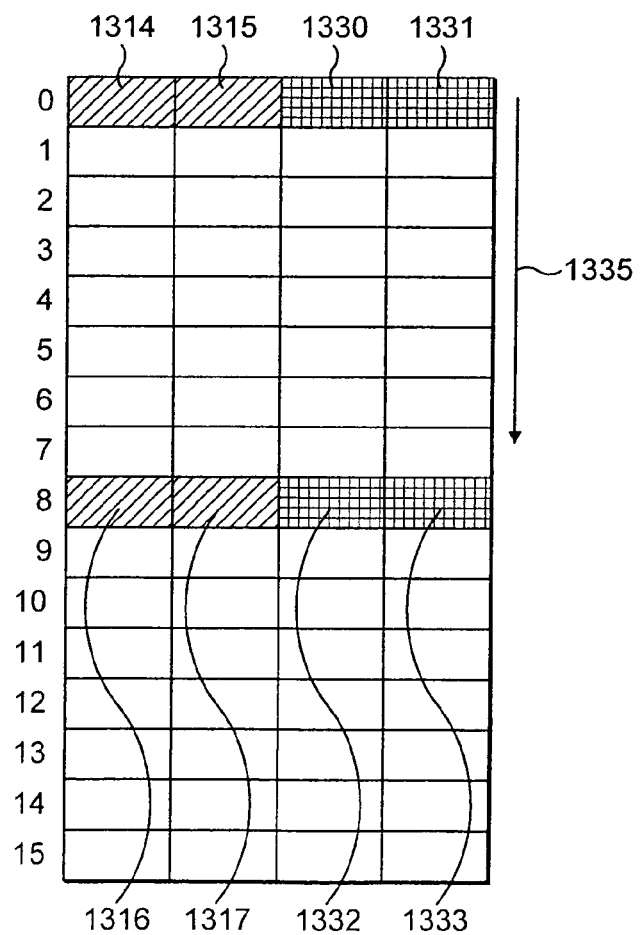

FIGS. 12A-12C and 13 show a set of sub-register access patterns to support the shuffle operations of FIGS. 5A through 8, in accordance with an embodiment of the invention. FIG. 12A shows a sub-register access pattern for shuffling vectors with two 16-bit elements, as in FIG. 5A; FIG. 12B shows a sub-register access pattern for shuffling vectors with four 16-bit elements, as in FIGS. 5B and 5C; FIG. 12C shows a sub-register access pattern for shuffling vectors with eight 16-bit elements, as in FIGS. 6A and 6B; and FIG. 13 shows a sub-register access pattern for shuffling vectors with sixteen 16-bit elements, as in FIG. 7. In each of FIGS. 12A through 13, access is required to either the four register elements in two registers indicated on the left half of each figure (i.e. elements 1218-1221 in FIG. 12A, 1201-1204 in FIG. 12B, 1210-1213 in FIG. 12C, and 1314-1317 in FIG. 13), or to the four register elements in two registers indicated on the right half of each figure (i.e. elements 1222-1225 in FIG. 12A, 1205-1208 in FIG. 12B, 1226-1229 in FIG. 12C, and 1330-1333 in FIG. 13). Also, the arrows 1209, 1234, and 1335 in each figure indicate a range of alignments for each sub-register access pattern, with respect to the base of the array.

Figure 14:
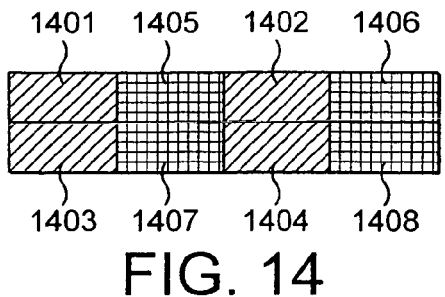
FIG. 14 shows a sub-register access pattern to support the sort operations of FIGS. 9A through 11, and others similar, in accordance with an embodiment of the invention.

FIG. 14 shows a sub-register access pattern to support the sort operations of FIGS. 9A through 11, in accordance with an embodiment of the invention. There is only one pattern required for all of the sort operations of FIGS. 9A through 11. Access is required either to the four elements 1401-1404, or to the four elements 1405-1408. Because source registers are always adjacent, dependency checking is simpler than in the case of a strided register pair (such as those required for the shuffles above), as too is register access.

Figure 15:
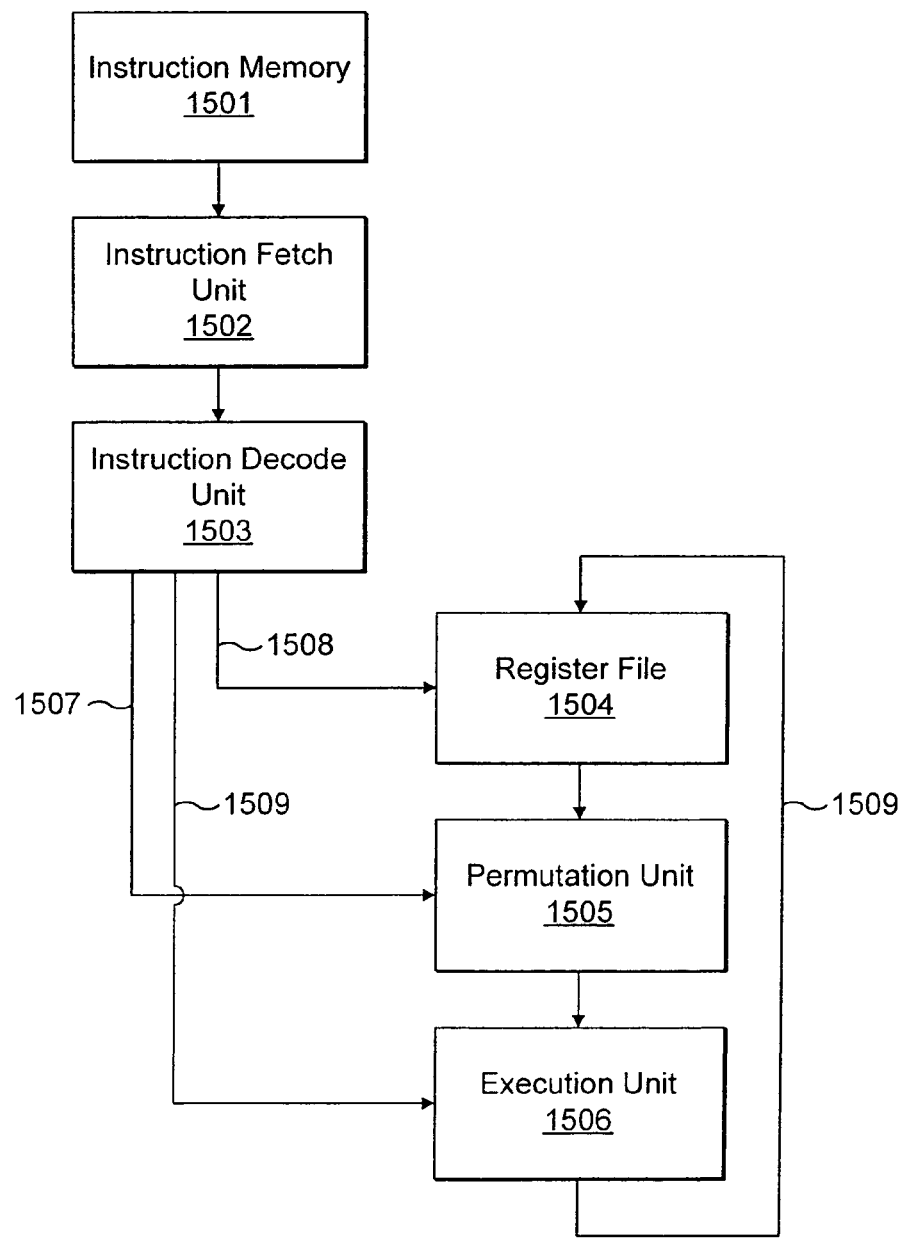
FIG. 15 shows an architectural block diagram of a computer system in which in-lined permutations may be used, according to an embodiment of the invention.

FIG. 15 shows an architectural block diagram of a computer system in which in-lined permutations may be used, according to an embodiment of the invention. An instruction fetch unit 1502 obtains instructions from an instruction memory 1501, and passes them to an instruction decode unit 1503. The decode unit 1503 decodes the various components of the instruction, including location information relating to the or each operand, and provides control outputs based thereon. The instruction decode unit 1503 obtains from the instruction an address of at least one operand that the instruction will use for its operation; and the address is used 1508 to obtain the corresponding data from a register file 1504. The instruction decode unit 1503 also obtains from the instruction a permutation operation code, which may be used 1507 to determine the nature of a permutation operation, which a permutation unit 1505 performs on the data obtained from the register file 1504 by the same instruction. The instruction decode unit 1503 further obtains from the instruction an execution operation code, which may be used 1509 to determine the nature of operation performed by the SIMD execution unit 1506 on each element of the vector operand(s) provided via the permutation unit 1505. Thus the type and location of data access, the nature of permutations on accessed vector elements, and the nature of SIMD operation subsequently performed on the elements of the permuted vectors are defined in a single instruction.

Figure 16:
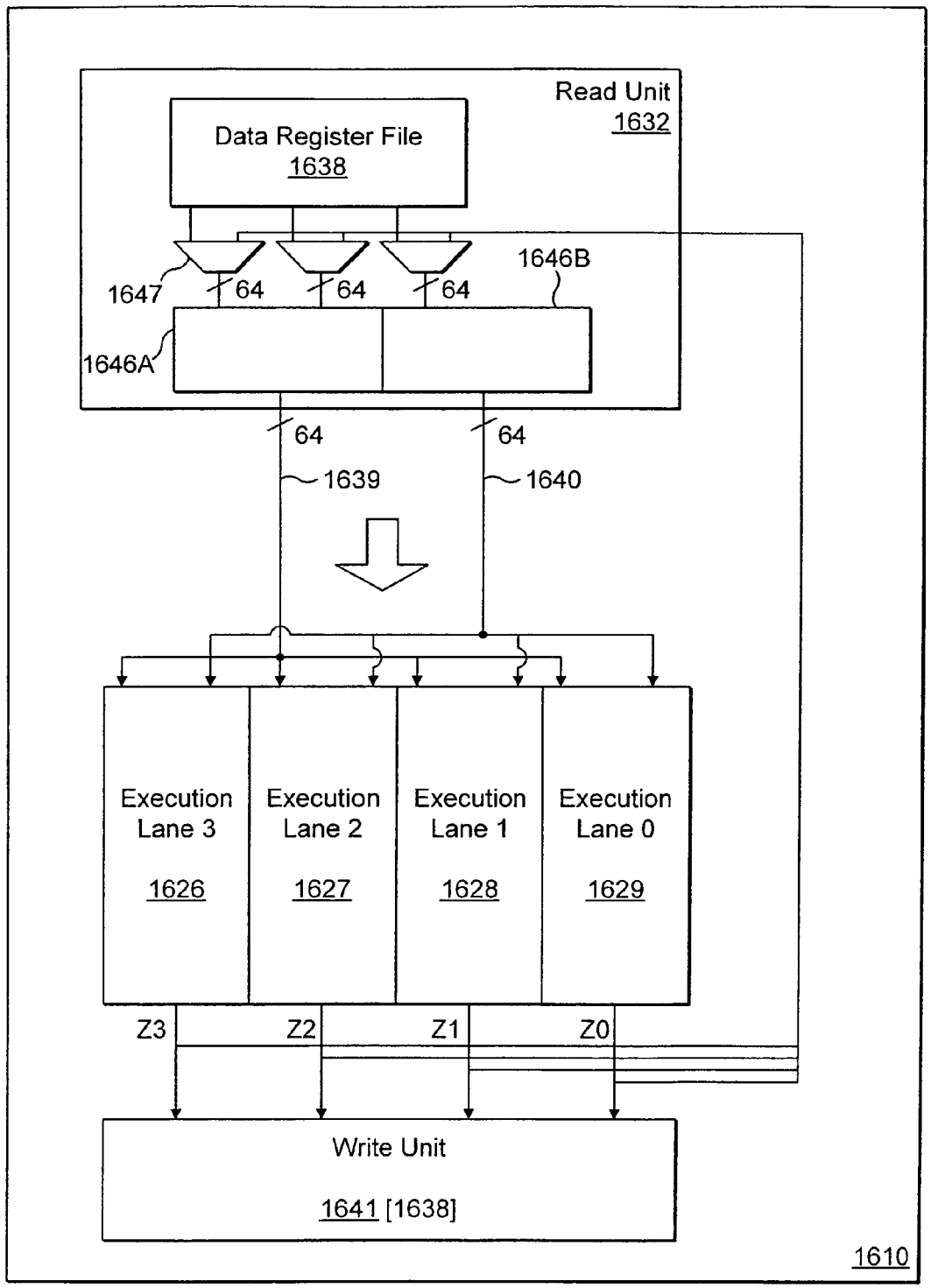
FIG. 16 shows a block diagram of a processor datapath capable of in-lined permutations according to an embodiment of the invention.

FIG. 16 shows a block diagram of a processor datapath 1610, corresponding to the combination of register file 1504, permutation unit 1505, and execution unit 1506 in FIG. 15, with which in-lined permutations may be used, according to an embodiment of the invention. In this embodiment, data processing instructions that use data registers as source operands use a deep register access mechanism 1646A,B to perform selected permutation operations on the values yielded when the registers are read.

In this example, the processor datapath 1610 of the embodiment of FIG. 16 is pipelined such that there is at least one set of pipeline registers in every path enclosed by the loop which passes from the execution lane outputs Z0-Z3 via the bypass multiplexers 1647, through the deep register access blocks 1646A and 1646B and through the execution lanes 1626-1629. A skilled person will appreciate that any suitable pipelining scheme may be used.

In the Read unit 1632 of the embodiment of FIG. 16, three 64-bit short vector register values are read from the data register file 1638 and permuted to form two 64-bit vector operands 1639 and 1640 by the deep register access units 1646A and 1646B, which implement various in-lined permutation operations described above in accordance with the permutation operation code in the instruction. These two permuted vector operands are delivered lane-wise to the four SIMD execution lanes 1626-1629 for further processing according to the execution operation code in the instruction. The lane-wise results Z0-Z3 together form a single 64-bit result vector which is returned for writing to the register file 1638 via write path 1641, and may optionally be bypassed directly to the deep register access units 1646A and 1646B for immediate execution of a subsequent pipelined operation.

In accordance with an embodiment of the invention, it will be appreciated that modifications my be made to the data processing unit of FIG. 16. For example, any number of SIMD_execution lanes 1626-1629 may be used; the lanes may operate on operands of any width; and a permutation unit may permute a subset of the operands, and need not necessarily permute all operands. Also, permutations need not necessarily be those illustrated, but may also be combinations thereof; or selections and gathers of such permutations; or other types of permutation. Also, permutation operations may be performed by a unit situated below the execution lanes 1626-1629. Such a 'post-execution' permute unit may be used alone, or in addition to 'pre-execution' permutations thus far described which are performed before data execution (such as by a deep register access mechanism 1646). After permutation by a 'post-execution' permute unit, operands can then be written back to the register file 1638 or bypassed via multiplexers 1647. Furthermore, control information for the in-line permutation units may be derived in part or in full from stored 'configuration' data instead of from information carried in instructions which are issued cycle-by-cycle. Such configuration information may be uploaded to processor control registers for example under program control and may then provide a static 'pseudo-instruction' to the permutation units for many processor cycles until a new configuration is uploaded, or until specific instructions are issued which can over-ride the static configuration information.

Figure 17:
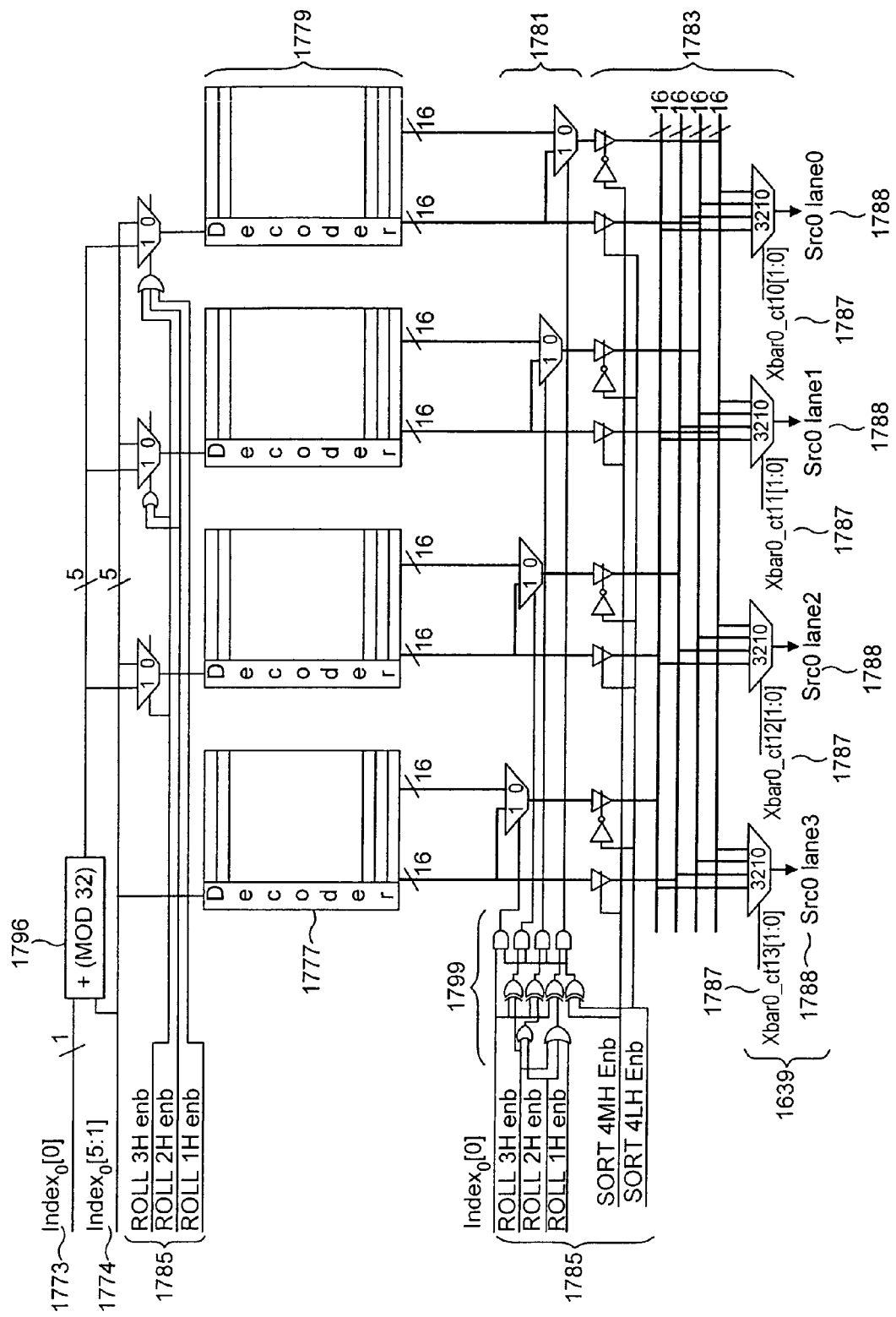
FIGS. 17 and 18 show exemplary hardware for implementing the register access function of FIG. 16, in accordance with an embodiment of the invention.
Figure 18:
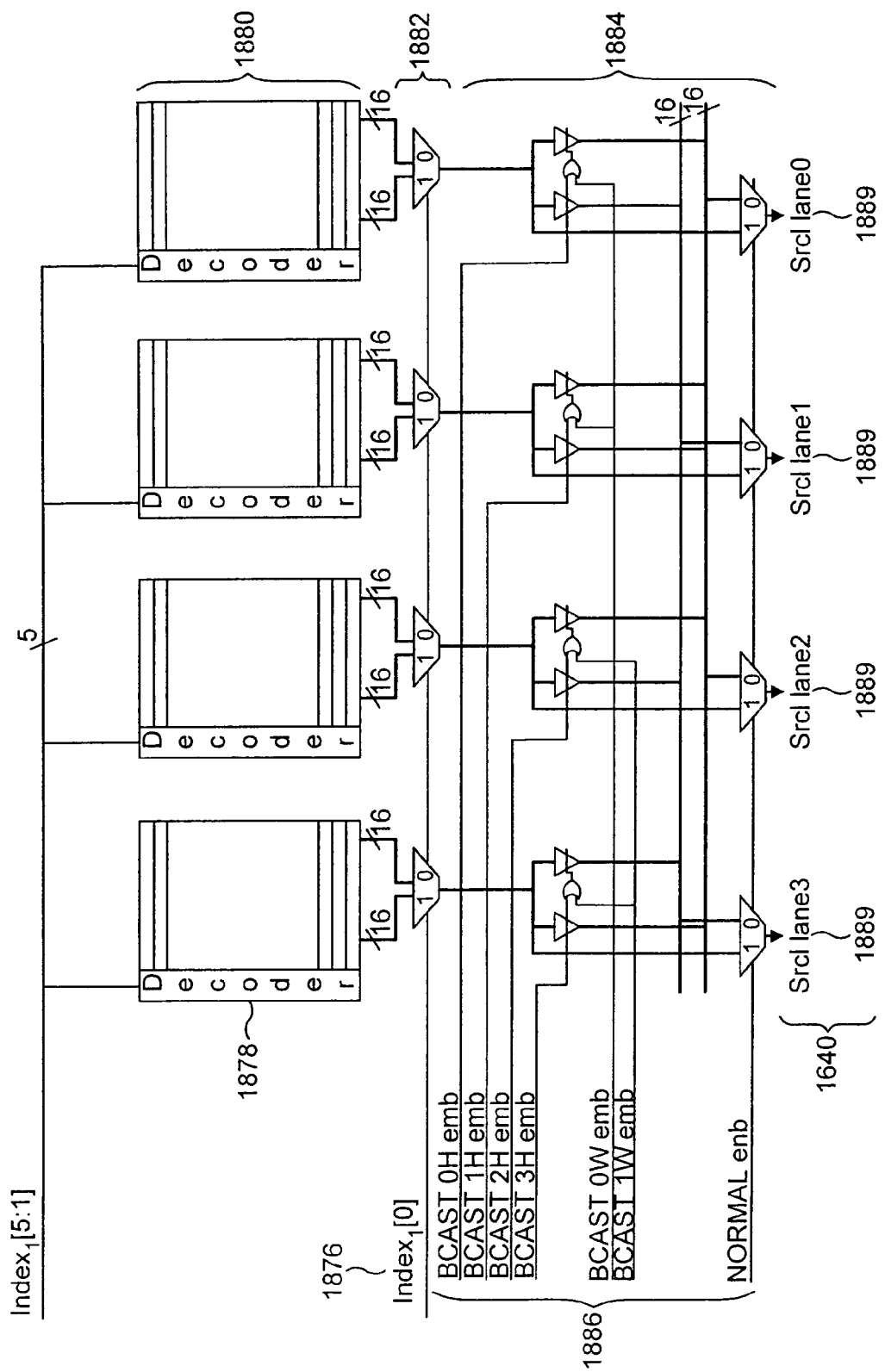

FIGS. 17 and 18 show exemplary hardware for implementing the deep register access functions 1646A and 1646B of FIG. 16, and for reading the registers 1638 of FIG. 16; in accordance with an embodiment of the invention. FIG. 17 shows hardware for fetching exemplary 64-bit vector SRC0 from the data register file 1638 using deep register access; while FIG. 18 shows hardware for fetching exemplary 64-bit vector SRC1 from the data register file 1646 using deep register access. In FIGS. 17 and 18, Index0 at 1773, 1774 and Index1 at 1875, 1876 each point to a 64-bit vector in the data register file 1638. The data register file 1638 contains sixty-four vectors (in this example), so that Index0 and Index1 each comprise six bits, numbered 0 to 5 in FIGS. 17 and 18. Decoders 1777 and 1878 of FIGS. 17 and 18 are simple one-out-of-thirty-two row decoders, and access sixty-four 16-bit words arranged in pairs on thirty-two lines. The decoders 1777 and 1878 are part of a register file read stage 1779, 1880 which is followed by a column multiplexer stage 1781, 1882 and an operand crossbar switch stage 1783, 1884, which has sixty-four or 32 cross-wires respectively. Inputs 1785 in FIG. 17 provide enable signals for deep register accesses that use roll and sort permutations on the accessed data vectors; additionally crossbar control inputs 1787 must be appropriately set to determine the type of deep register access that is used, according to the table in FIG. 19. In accordance with an embodiment of the invention, the values of the inputs Xbar0_ctl3, Xbar0_ctl2, Xbar0_ctl1, and Xbar0_ctl0, as well as the control inputs 1785, determine whether the deep register access is a normal access, or whether the deep register access involves a permutation such as a roll or sort permutation. Inputs 1886 in FIG. 18 provide enable signals for deep register accesses that use broadcast permutations on the accessed data vectors, as well as for normal register accesses (i.e. accesses without permutations). The outputs 1788 and 1889 of FIGS. 17 and 18 are the four lanes of the 64-bit vectors SRC0 and SRC1, respectively. These outputs are represented generally as permuted outputs 1639 and 1640 on FIG. 16, which shows how one element of each of the four-element vectors is supplied lane-wise to the SIMD circuitry.

The inputs of FIG. 17 additionally show a unit 1796, which is merely a 5 bit adder performing modulo 32 arithmetic and capable of wrapping in the event of overflow, and a control input logic stage 1799 connected to the column multiplexer stage, which stage supports the selection of the different types of permutation operation available in the first deep register access unit 1646A. These and other minor differences between FIGS. 17 and 18 will be easily understood by an averagely skilled reader in the context of the functionality of the disclosed embodiment.

Figures 19, 20:
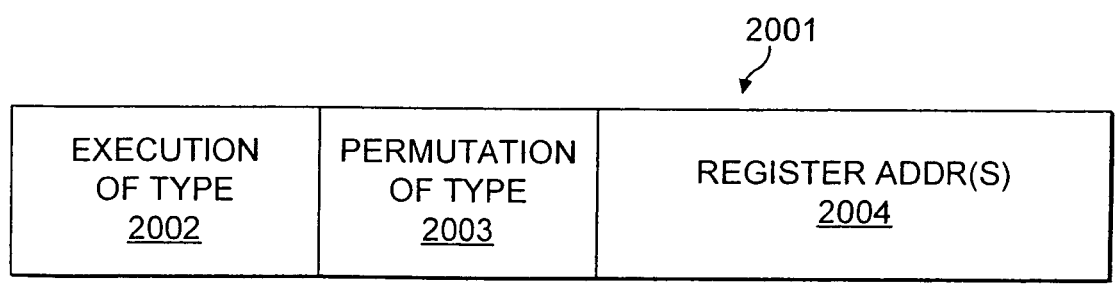
FIG. 19 is a table showing possible multiplexer control inputs in FIG. 17 to achieve various types of permutation, in accordance with an embodiment of the invention.
FIG. 20 shows a generalized instruction format which may be used in accordance with an embodiment of the invention.

In accordance with an embodiment of the invention the values of the inputs, used by the hardware of FIGS. 17 and 18 to control the type of deep register access to be used, such as the values of the Xbar0 inputs in FIG. 19, or other inputs for controlling the multiplexers of FIGS. 17 and 18), may be determined by the values of codes at predetermined locations in the instructions. That is, designated bits at predetermined bit locations in an instruction packet may be used to determine the type of deep register access to be used in the instruction. Thus, for example, instruction decode unit 1503 of the embodiment of FIG. 15 may use the value of a permutation operation code found in a specific field of the instruction, or encoded in combination with other instruction information, to control multiplexer selection in the crossbar of FIG. 17 or 18. The value of the designated bits may be decoded, and possibly combined with other configuration information stored in the processor, to determine the value of the Xbar0 inputs of FIG. 19, so as to determine which form of deep register access is used by that instruction, such as the type of sort, roll, broadcast, or shuffle to be applied. For example, FIG. 20 shows a generalized instruction format which may be used in accordance with an embodiment of the invention, although it will be appreciated that other instruction formats may be used. The instruction 2001 includes a field 2002 comprising bits specifying the type of execution operation (e.g. load, store, SIMD add, SIMD multiply, etc.); a field 2003 comprising bits specifying the type of permutation to be applied (e.g. sort, roll, broadcast etc.); and a field 2004 specifying the location of source operands and results in the register file.

It can be seen, then, that the embodiments of FIGS. 16 through 19 illustrate use of a series, in-line connection between the register file, a permutation unit, and an execution unit; in a similar fashion to that shown in the embodiment of FIG. 2. Specifically, with reference to FIGS. 16 through 18, the data register file read 1638 of FIG. 16, corresponding to the register file 201 of FIG. 2, is placed in series with the deep register access mechanisms 1646A and 1646B, corresponding together to the permutation unit 202 of FIG. 2; which in turn is in series with the SIMD execution lanes 1626-1629, corresponding together to the execution unit 203 of FIG. 2. A skilled reader will appreciate that, while the foregoing has described what is considered to be the best mode and where appropriate other modes of performing the invention, the invention should not be limited to specific apparatus configurations or method steps disclosed in this description of the preferred embodiment. Those skilled in the art will also recognize that the invention has a broad range of applications, and that the embodiments admit of a wide range of modifications without departing from the inventive concepts.

What is claimed is:

1. A data processing unit for a computer comprising: a register file;
a register access and permute unit capable of accessing at least one data operand in said register file based on a single data access instruction, said register access and permute unit comprising permute circuitry operable to selectively permute said accessed data operand based on a permute opcode portion of said single data access instruction; and
a data execution unit arranged in series with said register access and permute unit, said data execution unit being operable to perform an operation on said selectively permuted data operand based on an execution opcode portion of said single data access instruction.

2. A data processing unit as in claim 1, wherein said register access and permute unit comprises a decoder register file read stage connected between said register file and said execution unit.

3. A data processing unit as in claim 2, wherein said register access and permute unit comprises at least one multiplexer stage connected between said decoder register file read stage and said execution unit.

4. A data processing unit as in claim 3, wherein a permute control input is supplied to said multiplexer stage.

5. A data processing unit as in claim 2, wherein said register access and permute unit further comprises a column multiplexer stage connected between said decoder register file read stage and said execution unit.

6. A data processing unit as in claim 5, wherein a permute control input is supplied to said column multiplexer stage.

7. A data processing unit as in claim 2, wherein said register access and permute unit comprises a crossbar multiplexer stage connected between said decoder register file read stage and said execution unit.

8. A data processing unit as in claim 7, wherein a permute control input is supplied to said crossbar multiplexer stage.

9. A data processing unit as in claim 2, wherein a permute control input is supplied to said decoder register file read stage.

10. A data processing unit as in claim 1, comprising bypass circuitry connected between an output of said execution unit and an input of said register file access and permute unit.

11. A data processing unit as in claim 1, comprising first and second register access and permute circuitry.

12. A data processing unit as in claim 11, wherein said first register access and permute circuitry is arranged to access first and second operands and to perform a permutation selected from one or more of a roll, a sort, a shuffle.

13. A data processing unit as in claim 11, wherein said second register access and permute circuitry is arranged to access at least one operand and to perform a broadcast permutation.

14. A data processing unit as in claim 11, wherein said first and second register access and permute circuits each comprises one or more of:
(i) a decoder register file read stage connected between said register file and said execution unit;
(ii) at least one multiplexer stage connected between said decoder register file read stage and said execution unit.

15. A data processing unit as in claim 14, wherein said at least one multiplexer stage comprises one or more of:
(i) a column multiplexer stage connected between said decoder register file read stage and an execution unit; and
(ii) a crossbar multiplexer stage connected between said column multiplexer stage and said execution unit.

16. A data processing unit as in claim 1, wherein said execution unit comprises single-instruction, multiple-data circuitry.

17. A data processing unit for a computer processor comprising, in series connectivity, a register access unit, vector permutation circuitry, and at least one execution unit, the apparatus further comprising a decode unit operable, responsive to a single instruction, to control access to at least one vector operand, to selectively permute the at least one vector operand, and to execute at least one further operation.

18. A method of operating a data processing unit for a computer processor, the method comprising:
performing, by said data processing unit of said computer processor, a permutation operation responsive to a single data access instruction on at least one data operand accessed from a register file of the computer processor, the permutation operation being performed in series with (i) accessing a register to obtain said at least one data operand and (ii) executing a data processing operation on said at least one data operand; and
performing, by said data processing unit of said computer processor, the permutation operation in series with accessing the register based on the single data access instruction.

19. A method according to claim 18, wherein a permutation operation is performed on a single vector register operand.

20. A method according to claim 18, wherein a permutation operation is performed on a plurality of vector register operands.

21. A method according to claim 18, further comprising:
performing multiple consecutive data processing operations on a data operand of a single instruction.

22. A method according to claim 18, wherein performing the permutation operation precedes executing the data processing operation.

23. A method according to claim 18, wherein performing the permutation operation follows executing the data processing operation.

24. A method according to claim 18, wherein a first permutation operation precedes execution of the data processing operation and a second permutation operation follows execution of the data processing operation.

25. A method according to claim 18, further comprising:
selecting the type of the permutation operation from a plurality of permutation operation types based on an opcode portion of said instruction.

26. A method according to claim 18, further comprising selecting the executed data processing operation from: an arithmetic operation; a logic operation; a subsequent permutation operation; and a processor memory read or write operation.

27. A method according to claim 18, further comprising using a set of permute control inputs to at least partly determine the type of the permutation operation selected from a plurality of permutation operation types.

28. A method according to claim 27, wherein a plurality of permutation operation types available comprises one or more selected from: a roll permutation, a sort permutation, a shuffle permutation, a broadcast permutation, a select permutation, and another type of permutation operation.

29. A method according to claim 18, further comprising determining the value of a set of permute control inputs based on an opcode portion of the data processing instruction.

30. A method according to claim 18, wherein the data processing unit performs single instruction multiple data execution.

31. A method according to claim 18, wherein performing of the permutation and data processing operation comprises performing at least a portion of an algorithm from the group consisting of: a Fast Fourier Transform; Viterbi coding; Turbo-coding; a finite impulse response filter algorithm; another communications algorithm.

32. A method according to claim 18, wherein a first type of permutation operation is performed on a first source operand pair, and a second type of permutation operation is performed on a second source operand.

33. A method according to claim 32, wherein performing the first type of permutation operation comprises performing a permutation from the group consisting of: a roll permutation and a sort permutation.

34. A method according to claim 32, wherein performing the second type of permutation operation comprises performing a broadcast permutation.

35. A method according to claim 32, wherein performing one or more of the first and second types of permutation operations comprises using 64-bit data-register source arguments.

36. A method according to claim 35, wherein performing the first type of permutation operation allows performing roll operations for forming a single 64-bit result from two 64-bit source values, the 64-bit result corresponding to the source values rolled by an integer number of 16-bit elements.

37. A method according to claim 35, wherein performing the first type of permutation operation allows performing sort operations for forming a single 64-bit result from two 64-bit values, the 64-bit result being selectable as the most significant or the least significant 64-bit sort result.

38. A method according to claim 35, wherein performing the first type of permutation operation comprises performing shuffle operations for interleaving two vectors each consisting of an integer number of 16-bit elements.

39. A method according to claim 35, wherein the integer number of 16-bit elements is an integer power of two.

40. A method according to claim 35, wherein performing the second type of permutation operation allows performing a broadcast operation capable of repeating a 16-bit half-word across a plurality of 16-bit lanes in a 64-bit result.

41. A data processing unit for a computer comprising:
a register file;
a register access and permute unit capable of accessing at least one data operand in said register file based on a single data access instruction, said register access and permute unit comprising first and second register access and permute circuitry operable to selectively permute said accessed at least one data operand based on a permute opcode portion of said single data access instruction, said first register access and permute circuitry arranged to access first and second operands and perform a permutation selected from one or more of a roll, a sort, a shuffle and said second register access and permute circuitry arranged to access at least one operand and to perform a broadcast permutation; and
a data execution unit arranged in series with said register access and permute unit, said data execution unit being operable to perform an operation on said selectively permuted data operand or operands based on an execution opcode portion of said single data access instruction.

42. A method of operating a data processing unit for a computer processor, the method comprising:
performing, by said data processing unit of said computer processor, a permutation operation responsive to a single data access instruction on at least one data operand accessed from a register file of the computer processor, the permutation operation being performed in series with (i) accessing a register to obtain said at least one data operand and (ii) executing a data processing operation on said at least one data operand; and
performing, by said data processing unit of said computer processor, the permutation operation in series with accessing the register based on the single data access instruction, wherein a first type of permutation operation is performed on a first source operand pair, and a second type of permutation operation is performed on a second source operand.

* * * * *